(12) United States Patent
Miyasaka

(10) Patent No.: US 10,846,034 B2
(45) Date of Patent: Nov. 24, 2020

(54) DISPLAYING ERROR REPORTS WHEN PRINT JOBS AND PRINT SETTINGS ARE INCOMPATIBLE

(71) Applicant: SEIKO EPSON CORPORATION, Tokyo (JP)

(72) Inventor: Yasutake Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/443,620

(22) Filed: Jun. 17, 2019

(65) Prior Publication Data
US 2019/0384549 A1    Dec. 19, 2019

(30) Foreign Application Priority Data
Jun. 19, 2018   (JP) .................................. 2018-116463

(51) Int. Cl.
*G06F 3/12*   (2006.01)
(52) U.S. Cl.
CPC ............ *G06F 3/1255* (2013.01); *G06F 3/121* (2013.01); *G06F 3/1208* (2013.01); *G06F 3/1234* (2013.01)
(58) Field of Classification Search
CPC .................................................. G06F 3/1255
USPC .............................................. 358/1.15, 1.14
See application file for complete search history.

(56) References Cited

U.S. PATENT DOCUMENTS

| | | | | |
|---|---|---|---|---|
| 2008/0239382 | A1* | 10/2008 | Matsueda | G06F 3/121 358/1.15 |
| 2010/0253957 | A1 | 10/2010 | Sano et al. | |
| 2011/0058192 | A1 | 3/2011 | Hatanaka et al. | |
| 2015/0156348 | A1* | 6/2015 | Kittaka | G06F 3/1259 358/1.14 |
| 2017/0264789 | A1 | 9/2017 | Miyahara | |
| 2018/0207875 | A1* | 7/2018 | Menchik | B33Y 50/02 |
| 2019/0388967 | A1* | 12/2019 | Makinen | G06F 3/121 |

FOREIGN PATENT DOCUMENTS

JP    2012-145949    8/2012

OTHER PUBLICATIONS

European Search Report for EP19181347.6 dated Oct. 21, 2019.

* cited by examiner

*Primary Examiner* — Jacky X Zheng
(74) *Attorney, Agent, or Firm* — Workman Nydegger

(57) ABSTRACT

Problems may be caused by incompatibility between a print job and print settings. An image processing device controls displaying content by a display, and has a controller configured to determine whether or not a print job containing multiple image layers is compatible with a print setting, and displays an error report on the display when the print job and print setting are not compatible. The controller displays a first input field to receive a number of image layers as part of the print setting, and displays the error report when the number of image layers set according to an operation on the first input field is not compatible with the number of image layers contained in the print job.

9 Claims, 11 Drawing Sheets

DISPLAYING ERROR REPORTS WHEN PRINT JOBS AND PRINT SETTINGS ARE INCOMPATIBLE

BACKGROUND

1. Technical Field

The present invention relates to an image processing device and a non-transitory computer-readable computer medium storing an image processing program.

This application is based upon Japanese Patent Application 2018-116463 filed on Jun. 19, 2018, the entire contents of which are incorporated by reference herein.

2. Related Art

Display devices that, by using a specific color to display an image that is printed using a transparent recording material, display a second image that is printed using a transparent recording material at the same location on a print medium as a first image that is printed using a recording material other than a transparent recording material, are known from the literature. See, for example, JP-A-2012-145949.

However, the user is unable to confirm if the print settings are appropriate when printing an image in multiple layers, resulting in wasted printouts.

SUMMARY

An image processing device controls displaying content by a display, and has a controller configured to determine whether or not a print job containing multiple image layers is compatible with a print setting, and displays an error report on the display when the print job and print setting are not compatible.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. Note that the accompanying figures are for descriptive purposes only. The images are simply examples and may not conform to each other.

1. System Outline

Figure 1:
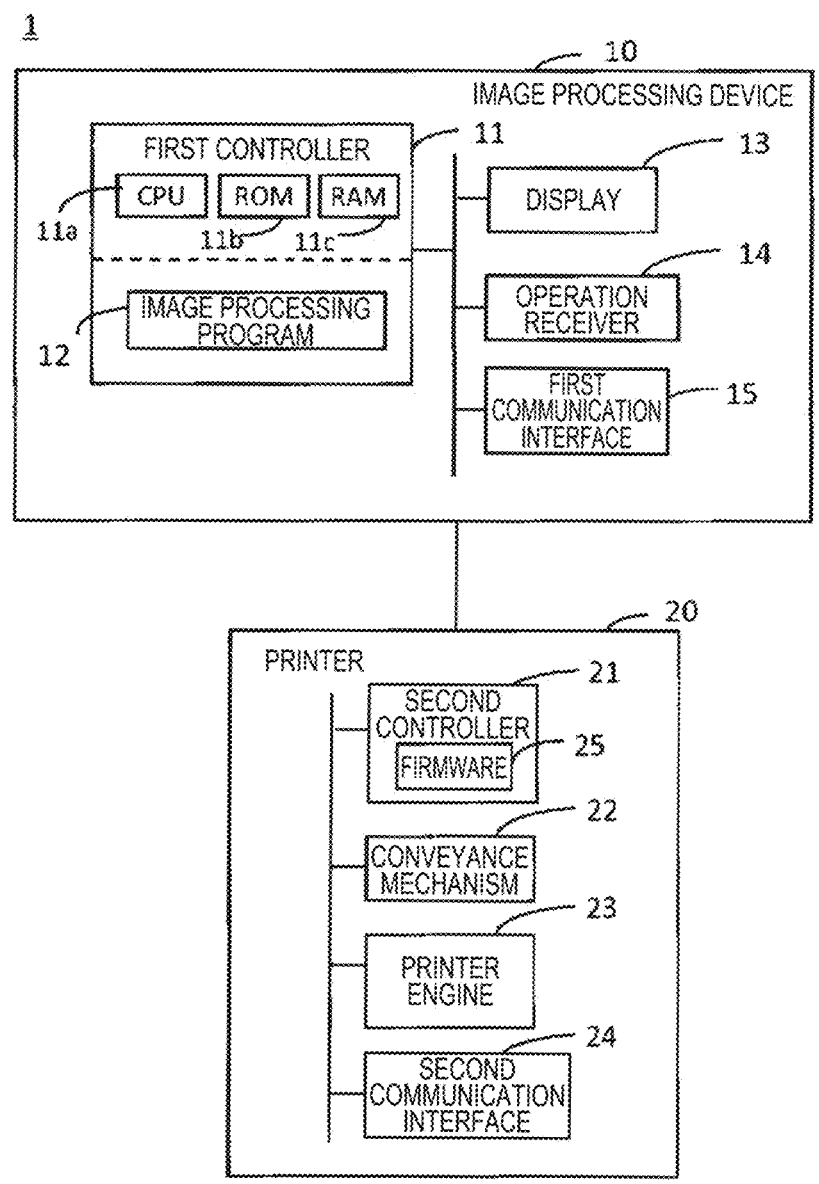
FIG. 1 is a simplified block diagram of the system configuration.

FIG. 1 is a block diagram of the configuration of a system 1 according to this embodiment. The system 1 includes an image processing device 10, and a printer 20. The system 1 may also be referred to as an image processing system or a printing system.

The image processing device 10 may be configured by a personal computer, smartphone, tablet computer, cell phone, other image processing device having equivalent processing capabilities. The image processing device 10 includes a first controller 11, display 13, operation receiver 14, and a first communication interface 15. The first controller 11 may be configured with multiple IC chips such as a CPU 11$a$ or other processor, RAM 11$c$ ROM 11$b$ or other type of nonvolatile memory.

The first controller 11 controls the image processing device 10 by the processor, the CPU 11$a$ in this example, executing processes according to a program stored in ROM 11$b$ or other memory, and using RAM 11$c$ or other memory as a work area. The first controller 11 in this example executes processes according to an image processing program 12. More specifically, an image processing program 12 is installed on the first controller 11. The image processing program 12 functions as RIP software that generates print data rendered for each color of recording material the printer 20 uses to print. RIP is an abbreviation for Raster Image Processor.

Note that the processor is not limited to configurations having a single CPU, and be configured to execute processes using multiple CPUs, an ASIC, or other hardware, or configured to execute processes through the cooperation of a CPU and other hardware circuits.

The display 13 is a means for visually presenting information, and may be configured with a liquid crystal display device or an OELD device, for example. The display 13 may also be a configuration having a display and a driver circuit for driving the display.

The operation receiver 14 is a means for receiving user operations, and may be configured with physical buttons, a touch panel, a mouse, keyboard, or other device. A touch panel may obviously configured as a function of the display 13. The display 13 and operation receiver 14 combined may also be referred to as an operating panel of the image processing device 10.

The display 13 and operation receiver 14 may be part of the configuration of the image processing device 10, or peripheral devices externally connected to the image processing device 10.

The first communication interface 15 is a general term for one or multiple interfaces enabling communication with external devices by wire or wirelessly according to a specific communication protocol, including known communication protocols.

The printer 20 includes a second controller 21, conveyance mechanism 22, printer engine 23, and a second communication interface 24. The conveyance mechanism 22 conveys print media in a specific conveyance direction. The print medium may also be referred to as simply media.

The printer engine 23 prints print data on the media conveyed by the conveyance mechanism 22 using an inkjet or electrophotographic printing method. The printer engine 23 prints by affixing different colors of recording material to the media based on the print data. The recording material the printer 20 uses in this embodiment is called ink, but references to ink may be replaced by references to toner.

The second communication interface 24 is a general term for one or multiple interfaces enabling communication with external devices by wire or wirelessly according to a specific communication protocol, including known communication protocols.

The second controller 21 includes a processor on the printer 20 side, and controls parts of the printer 20. The second controller 21 also includes firmware 25. The second controller 21 executes the firmware 25 to control the printer engine 23 to print based on print data sent from the image processing device 10.

The image processing device 10 and printer 20 are communicatively connected by wire or wirelessly through the first communication interface 15 and second communication interface 24. The image processing device 10 and printer 20 may obviously also connect through a network not shown. The printer 20 may also be configured as a multifunction device having multiple functions such as a scanner function, a facsimile function, or both, in addition to a printing function.

The image processing device 10 is also not limited to being configured as an independent, stand-alone image processing device, and may be configured by multiple image processing devices communicatively connected together through a network. The image processing device 10 and printer 20 may also be configured as a single integrated system. In other words, the processes executed by the image processing device 10 as described below may be executed by the printer.

2. Brief Description of Multi-Layer Printing

In this embodiment of the invention the image processing device 10 controls the printer 20 to execute multi-layer printing based on a print job.

Figure 2A:
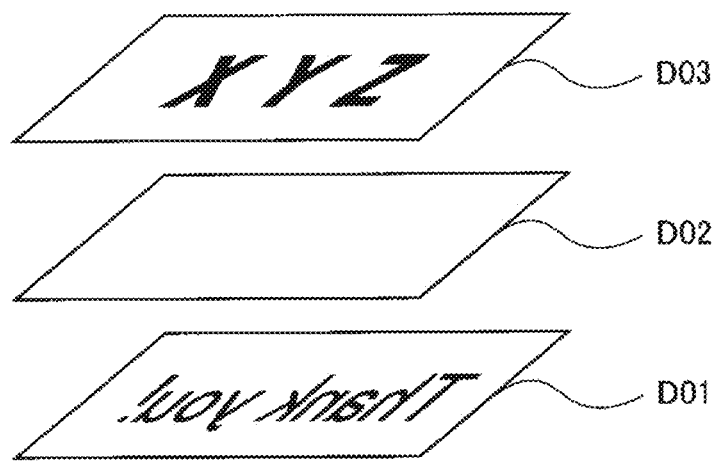
FIG. 2A shows an example of a print job having three printing layers.
Figure 2B:
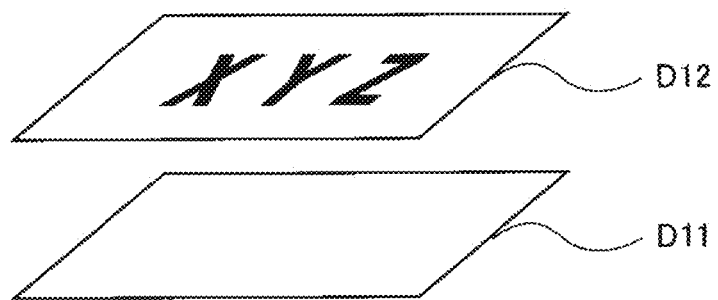
FIG. 2B shows an example of a print job having two printing layers.

FIG. 2 schematically illustrates multi-layer printing. FIG. 2A shows an example of when the print job the image processing device 10 executes contains three image layers, and FIG. 2B shows an example of when the print job the image processing device 10 executes contains two image layers.

The image data D01, D02, D03 shown in FIG. 2A are bitmap data, and are the image layers contained in one print job. An image layer may also be referred to as an impression. In this example, image data D01 and image data D03 are color image data for objects such as illustrations, photographs, text, or logos, and contain RGB (red, green, and blue) gradation values for each pixel in the image data.

Image data D02 is image data of a specific color (also referred to below as specific-color image data), and in this example represents an image layer printed with W (white) ink. In this embodiment, white is referred to as a specific color. The specific-color image data includes gradation values for the specific color for each pixel in the image data. The gradation values range from 0 to 255 representing 256 gradations in this example.

Image data D11 and D12 shown in FIG. 2B are also bitmap data, and are the image layers contained in one print job. In this example, image data D11 is image data of a specific color representing an image layer printed with white ink. Image data D12 is color image data. In this example the specific-color image data for an image layer printed with white ink is also referred to as a white impression.

To print based on a print job containing image data D01, D02, D03 such as shown in FIG. 2A, the image processing device 10, or more specifically the first controller 11 that runs the image processing program 12, generates print data from each of the image data D01, D02, D03. The first controller 11 then sends the print data generated for the three layers to the printer 20, causing the printer 20 to print based on the print data.

Likewise, to print based on a print job containing image data D11 and D12 such as shown in FIG. 2B, the first controller 11 that runs the image processing program 12 generates print data from each of the image data D11 and D12. The first controller 11 then sends the print data generated for the two layers to the printer 20, causing the printer 20 to print based on the print data.

More specifically, using a specific lookup table or function, the first controller 11 applies, to each pixel in the image data, a color conversion process that converts RGB gradation values to CMYK gradation values corresponding to the colors of ink the printer 20 uses to print, which in this example are CMYK (cyan, magenta, yellow, black) inks.

Using a specific lookup table or function, the first controller 11 also applies, to each pixel in the specific-color image data, a conversion process that converts the gradation values of the specific color, white in this example, to gradation values expressing the amount of ink of the specific color to print with consideration for the color reproducibility characteristics of the printer 20 and the characteristics of the media.

The first controller 11 then acquires print data for each image layer by applying a gradation conversion process such as halftone processing, for example, to the color image data and the specific-color image data acquired by the above conversion processes.

For simplicity and ease of understanding below, when the printer 20 is said to print based on print data the first controller 11 generates, for example, from image data D01 shown in FIG. 2A and FIG. 2B is referred to below as simply the printer 20 printing the image data D01.

In the example shown in FIG. 2A, the color image data D01 for the first layer is printed on transparent film used as the print medium in this example, the specific-color image data D02 for the second layer is then printed, and finally the color image data D03 for the third layer is printed. As a result, the specific-color image data D02 printed as the second layer forms a base layer for the color image data D01 of the first layer and the color image data D03 of the third layer, the image formed by the color image data D01 on the first layer is therefore visible from one side of the transparent film, and the image formed by the color image data D03 on the third layer is visible from the other side of the transparent film.

In the example shown in FIG. 2B, the specific-color image data D11 for the first layer is printed first using paper as the medium, and the color image data D12 for the second layer is then printed. As a result, the specific-color image data D11 printed on the first layer is the base layer of the color image data D12 printed on the second layer, and the image expressed by the color image data D12 on the second layer is visible.

Note that the specific color is not limited to white. Clear ink and metallic ink are other examples of specific colors of ink. More specifically, the print job may include specific-color image data in which an image layer printed with clear ink is expressed by gradation values for each pixel, or specific-color image data in which an image layer printed with metallic ink is expressed by pixel gradation values.

The number of image layers in a print job may also be greater than three. In one embodiment of the invention, the image processing device 10 processes print jobs containing specific-color image data and color image data as image layers. Note also that specific-color image data expressing an image layer printed with clear ink is referred to as a clear impression, and specific-color image data expressing an image layer printed with metallic ink is referred to as a metallic impression.

3. User Interface Display Control Process

Figure 3:
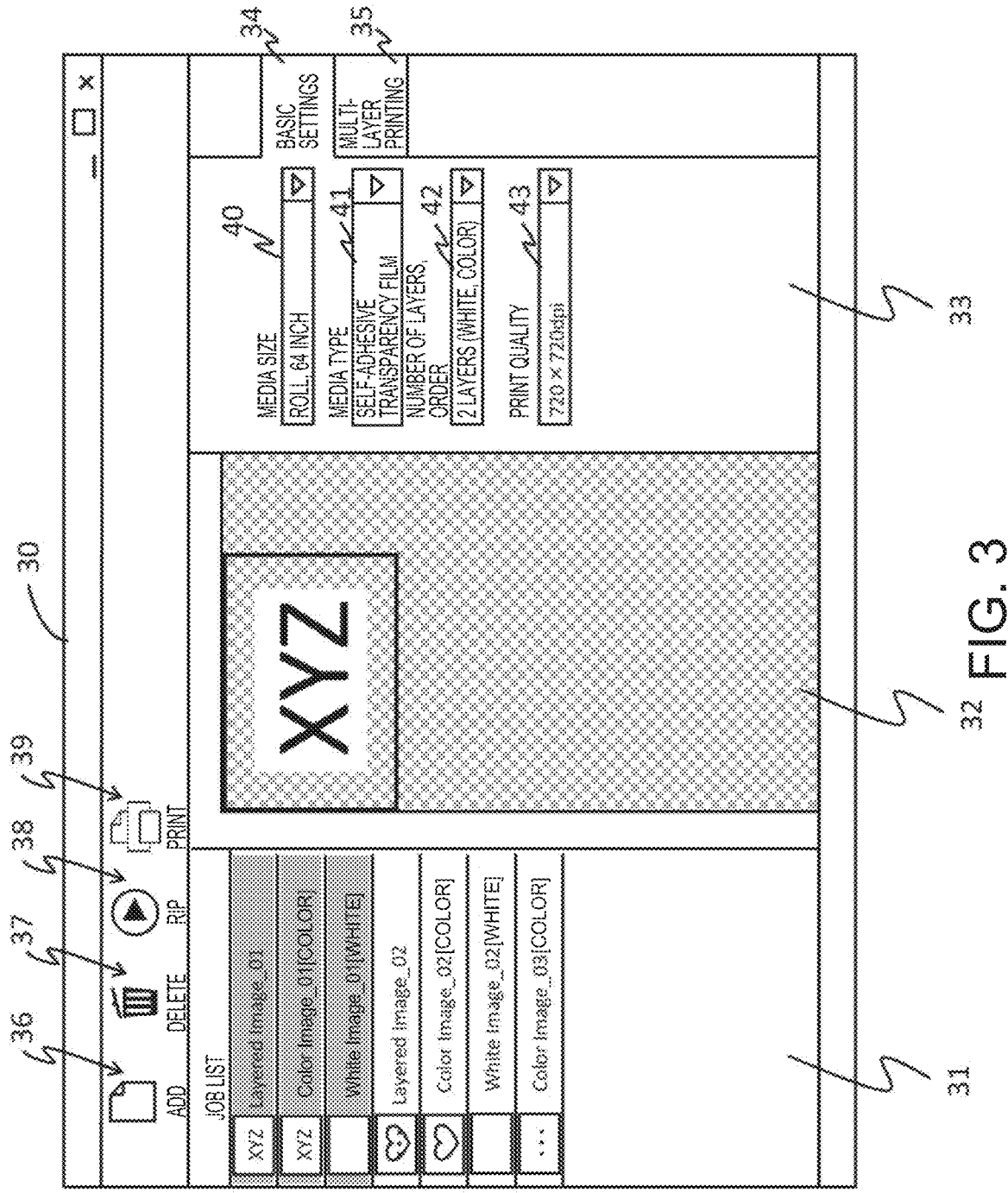
FIG. 3 shows an example of a user interface.

FIG. 3 shows an example of a user interface according to this embodiment. When the first controller 11 starts the image processing program 12 in response to user operation of the operation receiver 14, the first controller 11 displays the user interface window 30 on the display 13 according to the image processing program 12.

The user interface window 30 includes a job list pane 31, a preview pane 32, and a print settings pane 33. Multiple tabs 34, 35 are displayed in the print settings pane 33, and the user interface for the print settings corresponding to the tab selected by the user is displayed in the print settings pane 33. In the example in FIG. 3, the basic settings tab 34 is selected, and multiple input fields 40, 41, 42, 43 corresponding to the basic settings tab 34 are displayed in the print settings pane 33.

Input field 40 is for receiving the setting for the size of media used for printing. Input field 41 is for receiving the setting for the type of media. Input field 42 is for receiving the setting for the number of layers, also referred to as the layer count, contained in the print job, and the setting for the printing sequence of the image layers. The printing sequence of the image layers is the order in which the image layers are printed. Input field 43 is for receiving the setting for the print quality setting. In this example, each of the input fields 40, 41, 42, 43 is displayed as a pull-down menu, and the user can select the desired media size, media type, number of layers and printing sequence, and print quality settings from among multiple options.

The user interface window 30 also has an Add button 36, Delete button 37, RIP button 38, and a Print button 39. The Add button 36 is a button for adding a print job to the job list pane 31. The first controller 11 reads the desired image file F selected by the user operating the Add button 36 from the address where the image file F is stored. The user can select the desired image file F from any device accessible by the first controller 11, including internal or external memory of the image processing device 10, a hard disk drive, or a server on a network, for example.

Figure 4:
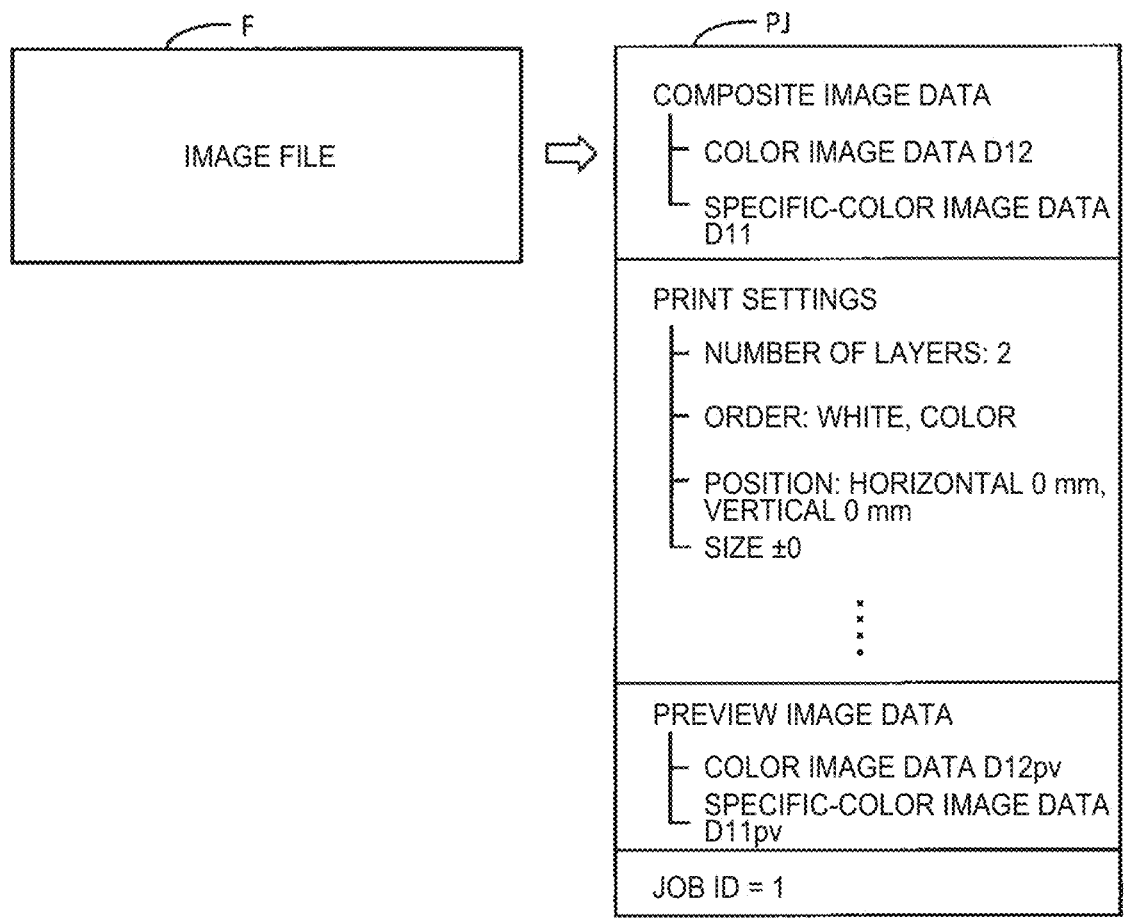
FIG. 4 shows a simple example of a print job configuration.

FIG. 4 shows a simple example of the configuration of a print job.

The first controller 11 creates a print job PJ in a specific format from the image file F selected by the user operating the Add button 36 as described above.

The image file F is a file expressing an image previously generated using a drawing program or image editor, for example. The first controller 11 analyzes the image file F, and stores the image layers configuring the image expressed by the image file F as a print job PJ. The image expressed by the image file F may also be referred to as composite image data. In the example in FIG. 4, the composite image data of the image file F is assumed to comprise the specific-color image data D11 and color image data D12 shown in FIG. 2B. In this case, the first controller 11 stores the image data D11 and D12 of the composite image data of the image file F.

Note that depending on the format of the image file F, the composite image data may be image data produced by merging multiple image layers. In this case, the first controller 11 analyzes and separates the composite image data into multiple image layers of color image data and specific-color image data, and stores the separated image layers.

The first controller 11 then generates preview image data for each image layer stored as part of the print job PJ, and stores the generated preview image data as part of the print job PJ. In the example in FIG. 4, the first controller 11 generates specific-color image data D11$pv$ by reducing the specific-color image data D11 by a specific reduction ratio, and stores the result as preview image data for one image layer. The first controller 11 similarly generates color image data D12$pv$ by reducing the color image data D12 by a specific reduction ratio, and stores the result as preview image data for one image layer The print job PJ also includes print settings information. However, the print settings information in the print job PJ is information the first controller 11 acquires in response to operation of the print settings pane 33. When the first controller 11 generates the print job PJ based on the image file F selected as described above in response to operation of the Add button 36, the print settings in the print job PJ are either blank or set to specific default settings.

The first controller 11 also assigns a job ID to the print job PJ to differentiate it from other print jobs.

Figure 5:
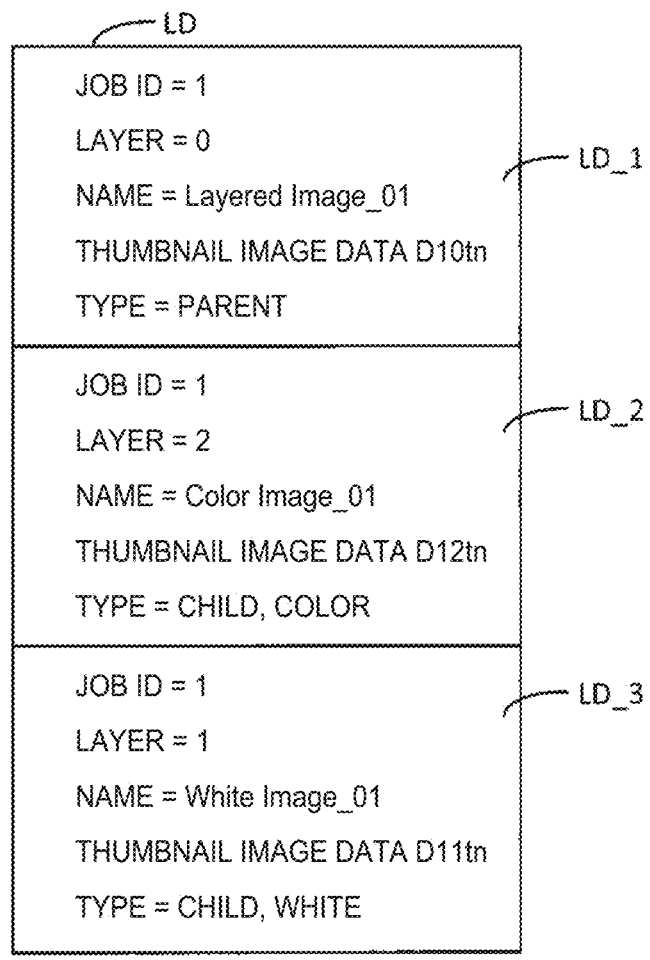
FIG. 5 shows a simple example of list data for a print job.

FIG. 5 shows a simple example of the configuration of list data LD for a print job PJ. One list data LD object is data for displaying the existence of one print job PJ in the job list pane 31.

The first controller 11 generates and stores the list data LD relationally to the print job PJ. The list data LD may be understood as part of the print job PJ. The list data LD is a set of data for identifying the corresponding print job PJ, and data identifying the image layers contained in the print job PJ. In the list data LD, the data identifying the print job PJ is referred to as parent data, and the data identifying the image layers in the print job PJ is referred to as child data.

In the example in FIG. 5, reference numeral LD_1 identifies the parent data, and reference numerals LD_2 and LD_3 identify child data. In this example, child data LD_2 is data for identifying color image data D12 in the job list pane 31, and child data LD_3 is data for identifying specific-color image data D11 in the job list pane 31. The parent data LD_1 and child data LD_2, LD_3 in the list data LD all contain the job ID of the corresponding print job PJ, that is, the same job ID.

In addition to the job ID, data LD_1, LD_2, LD_3 contain such information as the layer order, name, thumbnail image data, and layer type.

The layer order indicates the relative sequence of the data LD_1, LD_2, LD_3 having the same job ID. However, the first controller 11 sets the layer order of the parent data LD_1 to 0. Layer order 0 means that data object is displayed at the top in the group of data objects having the same job ID in the job list pane 31.

The first controller 11 may automatically assign the layer order of the child data LD_2 and LD_3. Alternatively, when information directly or indirectly indicating the layer order of the image layers is specified in the image file F from which the print job PJ is generated, the first controller 11 may set the layer order of the child data LD_2 and LD_3 based on that information. In any case, the layer order is information indicating the display sequence of items listed in the job list pane 31, and the method of setting the order should not be interpreted as being limited. The actual layer order of the image layers in the print job, that is, the printing sequence, is set through input field 42 in the print settings pane 33.

The first controller 11 also sets the names of data LD_1, LD_2, LD_3 by analyzing the image file F based on which the print job PJ is generated. The first controller 11 may use the file name of the image file F as the name of the parent data LD_1. For the names of the child data LD_2 and LD_3, the first controller 11 may also use the specified name of each image layer as the name of the child data LD_2 and LD_3 if the name of each image layer is specified in the image file F. If the name of each image layer is not specified in the image file F, the first controller 11 may reference the file name of the image file F to automatically assign a different name for each image layer to the child data LD_2 and LD_3. The first controller 11 may also not assign a name to the child data LD_2 and LD_3, that is, leave the name field blank.

The thumbnail image data is image data that is reduced even more than the preview image data. More specifically, the first controller 11 reduces the color image data D12 even more than when generating the color image data D12*pv*, generating thumbnail image data D12*tn* corresponding to the color image data D12, and stores the thumbnail image data D12*tn* in the child data LD_2.

The image processing program 12 also stores thumbnail image data D10*tn*, which is generated by overlaying thumbnail image data D12*tn* corresponding to the color image data D12 with thumbnail image data D11*tn* corresponding to specific-color image data D11 in the parent data LD_1.

The first controller 11 also sets information identifying the parent data LD_1 as parent data as the data type of parent data LD_1, and information identifying the child data LD_2 and LD_3 as child data as the data type of child data LD_2 and LD_3. For the child data LD_2 and LD_3, the first controller 11 also adds information such as color or white as data type information indicating whether the corresponding image layer is color image data or specific-color image data.

Based on the generated list data LD, the first controller 11 displays print jobs in the job list pane 31 as shown in FIG. 3. In the example in FIG. 3, Layered Image_01, Color Image_01 (color), and White Image_01 (white) shown in the job list pane 31 identify one print job and the image layers contained in the one print job. More specifically, the first controller 11 consecutively displays the name Layered Image_01 of the print job PJ based on the parent data LD_1 in the list data LD, Color Image_01 (color) as the name and type of the image layer based on child data LD_2, and White Image_01 (white) as the name and type of the image layer based on child data LD_3 in the job list pane 31.

As will be understood from FIG. 3, a small rectangular thumbnail image is also displayed in the job list pane 31 together with the names of the print job and image layers. The thumbnail images in the job list pane 31 are displayed based on the thumbnail image data D10*tn*, D11*tn*, and D12*tn* in the list data LD. Note that in the example in FIG. 3, the information of the child data LD_2 and LD_3 sharing the same job ID is displayed in descending order of the layer order number set in the list data LD.

Prompted by the user operating the Add button 36 to select a desired image file F, the first controller 11 generates print job PJ and list data LD based on the selected image file F, and based on the generated list data LD displays the presence of the print job PJ in the job list pane 31 of the user interface window 30 as described above. As a result, the user knows that a print job was added to the job list pane 31.

For convenience below, the print job indicated by Layered Image_01 in the job list pane 31 is referred to as the first print job. The job list pane 31 is an area for displaying a job list of one or more print jobs.

By displaying Layered Image_02, Color Image_02 (color), White Image_02 (white) and Color Image_03 (color) in the job list pane 31 in the example in FIG. 3, a second print job that is different from the first print job, and the image layers in the second print job, are also displayed. As described with reference to FIG. 4 and FIG. 5, this second print job is added to the job list pane 31 through the process of generating a print job and list data based on the desired image file selected by the user.

Figure 6:
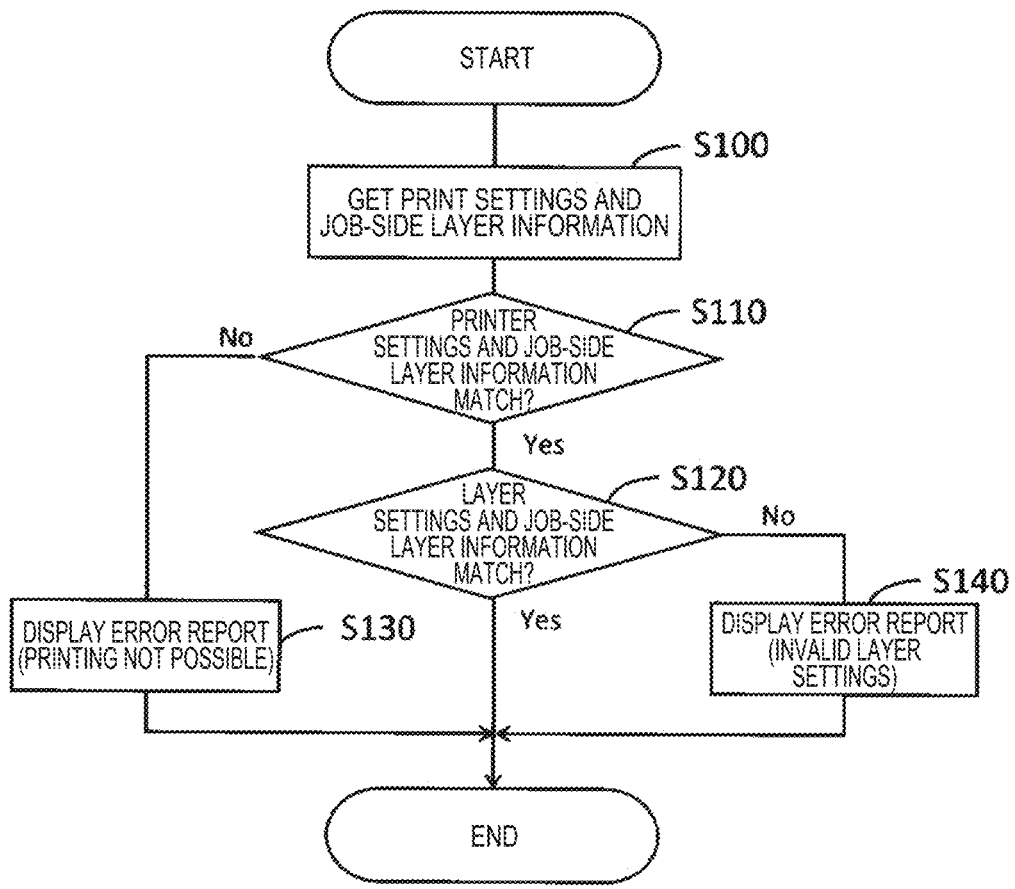
FIG. 6 is a flow chart of an error display control process.

FIG. 6 is a flow chart of an error display control process the first controller 11 executes according to the image processing program 12.

The first controller 11 starts the process shown in the flow chart in FIG. 6 when a specific condition is met. The specific condition for starting the process of the flow chart in FIG. 6 in this example is that a print job is selected from the job list pane 31. The user can select a specific print job or image layer from the job list pane 31 by operating the operation receiver 14. When the user interface window 30 is displayed on the display 13 and selection of a print job from the job list pane 31 is detected, the first controller 11 starts the process shown in FIG. 6.

In the example in FIG. 3, the first controller 11 detects that a print job was selected if the field indicating the Layered Image_01 in the first print job, or the field indicating the Layered Image_02 in the second print job is selected by the user operating the cursor or other pointing device.

Selection of the first print job is indicated in FIG. 3 by displaying part of the job list pane 31 gray. More specifically, when the first controller 11 detects that the display field Layered Image_01 of the first print job was selected, it determines the first print job was selected and changes a display state, such as the color, of the Layered Image_01, Color Image_01 (color) and White Image_01 (white) fields in the job list pane 31 to a different state (color, in this example) than the other parts of the job list pane 31.

In step 100, the first controller 11 acquires the print settings and job-side layer information. The print settings acquired in step S100 are the print settings currently set in the print settings pane 33, and the settings of specific items (parameters) in the printer 20. The settings of specific items on the printer 20 are referred to as simply printer settings.

The printer settings in this example indicate the type of ink installed in the printer 20. The first controller 11 acquires the printer settings, which is information indicating the type of ink installed in the printer 20, by communicating through the first communication interface 15 with the printer 20. Alternatively, in step S100 the first controller 11 may also read the printer settings previously acquired from the printer 20 and stored in a specific memory.

When the image processing device 10 can communicate with multiple printers 20, the first controller 11 may receive the user's selection of the printer 20 to use for printing, and acquire the printer settings from the selected printer 20. In this case, the first controller 11 acquires the settings of specific items from the printer 20 that is selected to print based on the print job as part of the print settings in step S100.

The job-side layer information is information about the print job to be evaluated for compatibility with the print settings. More specifically, the job-side layer information is information related to the image layers contained in the print job selected from the job list pane 31, that is, the number of image layers and the type of each image layer in the print job. The type of image layer indicates whether the image layer is color image data or specific-color image data, and if specific-color image data, whether it is a white impression, metallic impression, or clear impression.

In step 110, the first controller 11 determines whether the printer settings in the print settings acquired in step S100 conform to the job-side layer information acquired in step S100. If the printer settings and job-side layer information are compatible, the first controller 11 goes to step S120, and otherwise goes to step S130.

If the first print job is selected in the job list pane 31, the job-side layer information acquired in step S100 is information related to the image layers in the first print job, that is, information related to the color image data D12 and specific-color image data D11. As described above, the specific-color image data D11 is a white impression. Therefore, if the printer settings indicate the colors of ink, such as CMYK, and white ink, the first controller 11 determines the printer settings and job-side layer information are compatible, and goes to step S120. However, if the printer settings indicate only the colors of ink, such as CMYK, or CMYK ink colors and metallic ink or clear ink, that is a specific color of ink other than white ink, the first controller 11 determines the printer settings and job-side layer information are not compatible, and goes to step S130.

In step 130, the first controller 11 reports an error on the display 13. Because the ink required to print the print job is not installed in the printer 20, in step S130 the first controller 11 reports that printing is not possible. The error report issued in step S130 may be referred to as a first error report.

Figure 7:
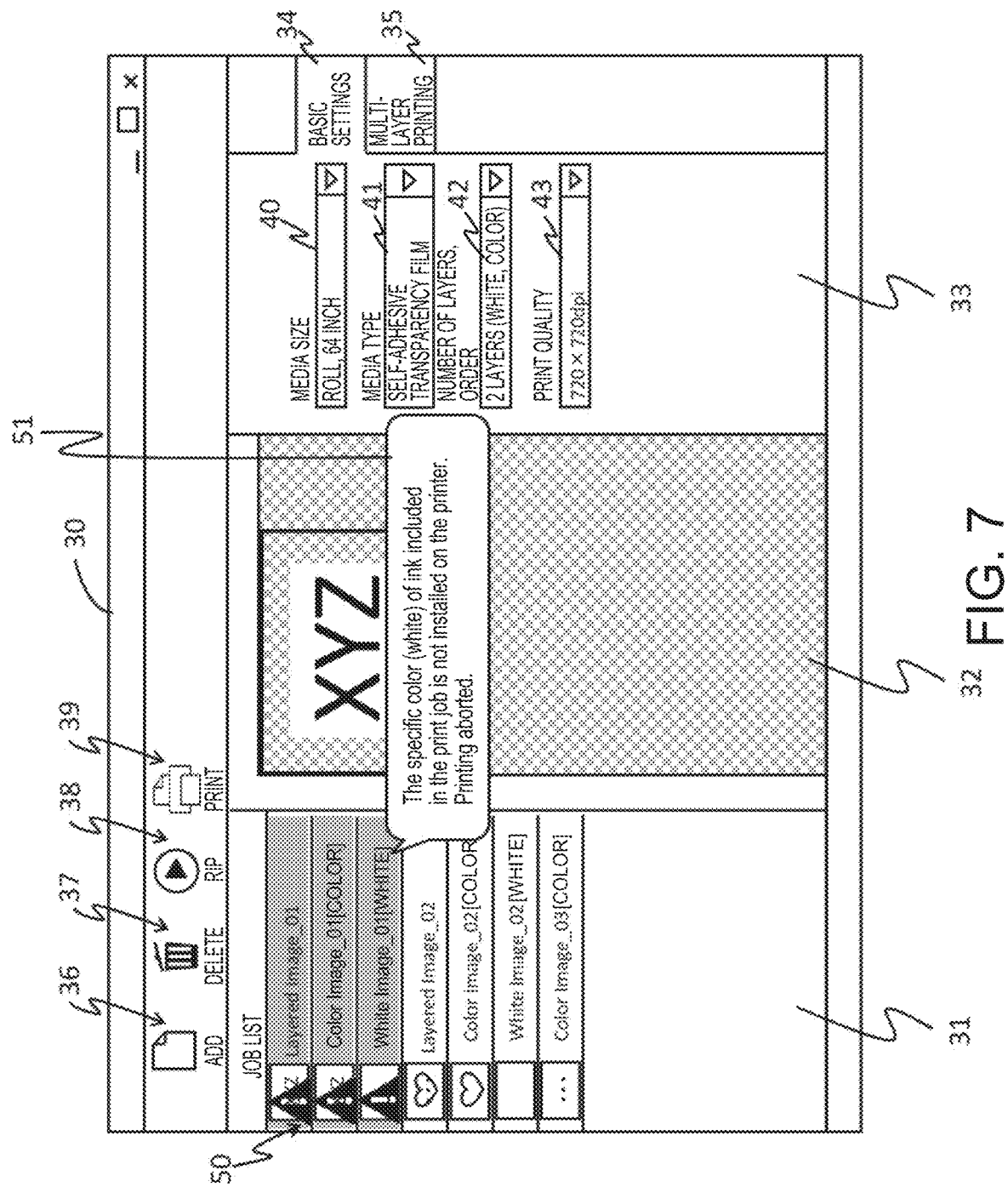
FIG. 7 shows an example of a user interface including displaying an error report in step S130.

FIG. 7 shows an example of a user interface window 30 including an error report displayed in step S130. In this example, the first controller 11 reports an error by superimposing a specific icon 50 indicating an error in the display area of the print job selected in the job list pane 31. The first controller 11 may also display an error report by displaying a popup message 51 describing the content of the error in the user interface window 30. In this example, the message 51 contains text such as "The specific color (white) of ink included in the print job is not installed on the printer. Printing aborted."

When an error is reported in step S130, the first controller 11 may also disable printing based on the selected print job. For example, if the same print job remains selected in the job list pane 31, the first controller 11 may disable the Print button 39 in the user interface window 30. The Print button 39 is a button for starting printing based on the print job selected in the job list pane 31, and by disabling the Print button 39, producing an unusable (wasted) printout can be avoided.

In step 120, the first controller 11 determines if the layer settings in the printer settings acquired in step S100 are compatible with the job-side layer information acquired in step S100. The layer settings include the number of layers and the layer order set in input field 42 of the print settings pane 33 in this example of a user interface window 30.

Suppose, for example, that the first print job is selected in the job list pane 31. In this case, the job-side layer information acquired in step S100 is information related to the color image data D12 and specific-color image data D11 included in the first print job. If the content of the layer settings is the layer count=2 and the layer order is white-color, or color-white, the first controller 11 determines the layer settings are compatible with the job-side layer information, and exits the process of the flow chart in FIG. 6 without reporting an error.

The layer order white-color means that a white impression is printed on the first layer, and a color image should be printed as a second layer over the first layer. If the layer order is color-white, a color image is printed on the first layer, and a white impression should be printed as a second layer over the first layer.

If the layer count in the layer settings is not 2, or the layer order is neither white-color or color-white, the first controller 11 determines the layer settings are not compatible with the job-side layer information, and goes to step S140.

In step 140, the first controller 11 displays an error report on the display 13. In step 140, the first controller 11 also reports that the layer settings are invalid. The error report issued in step S140 may also be referred to as a second error report.

Figure 8:
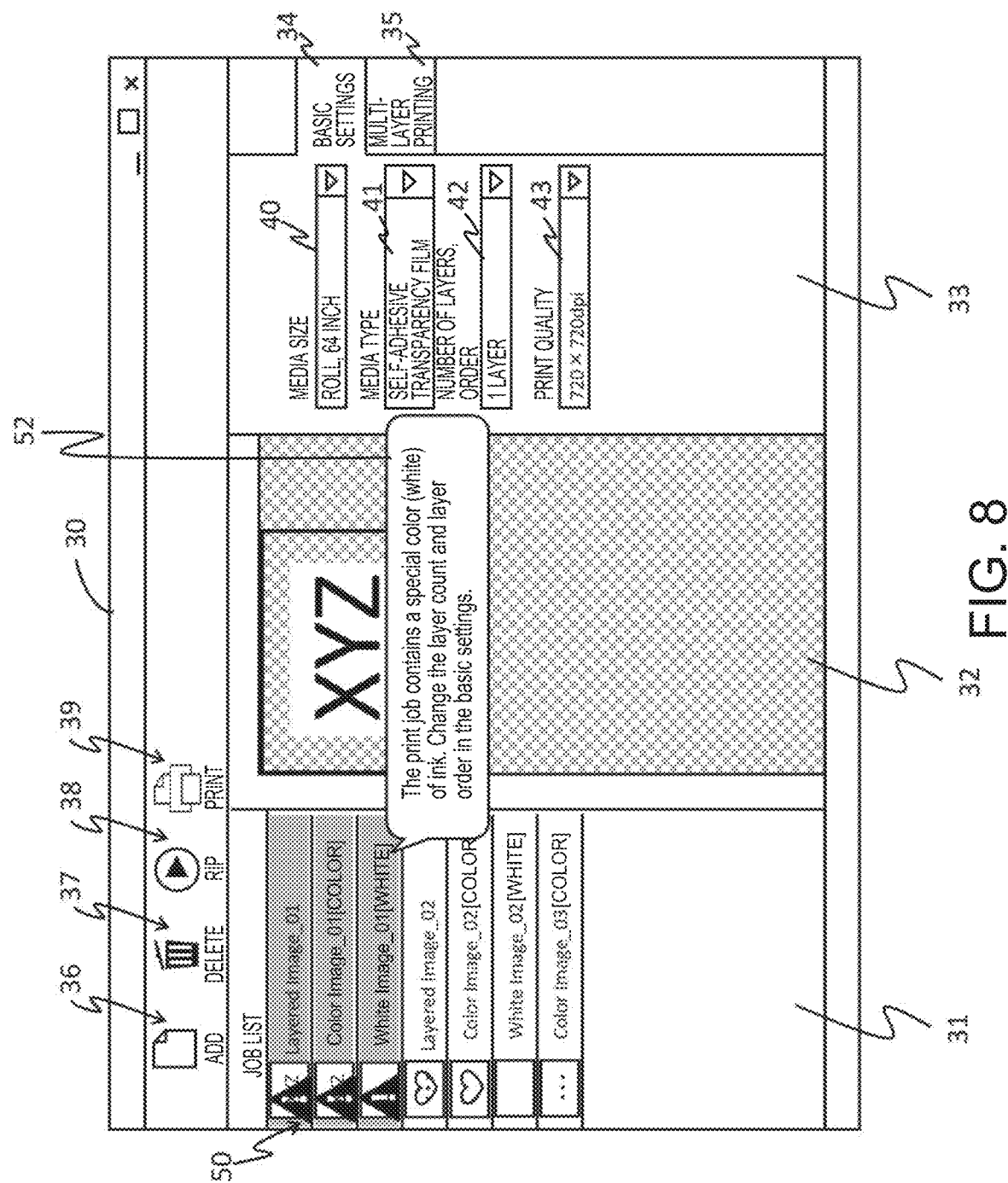
FIG. 8 shows an example of a user interface including displaying an error report in step S140.

FIG. 8 shows an example of a user interface window 30 including an error report displayed in step S140. In the example in FIG. 8, the layer count and layer order are set to one in input field 42 of the print settings pane 33. If the layer count is set to 1, the layer order setting is obviously blank. When the layer count is set to one, the layer count does not match the number of image layers (2) included in the first print job selected in the job list pane 31. Step S120 therefore returns No, and an error report such as shown in FIG. 8 is displayed in step S140.

The first controller 11 may also report an error by superimposing a specific icon 50 indicating an error in the display area of the print job selected in the job list pane 31 as in the example in FIG. 7. The first controller 11 may also display an error report by displaying a popup message 52 describing the content of the error in the user interface window 30. In this example the message 52 contains text such as "The print job contains a special color (white) of ink. Change the layer count and layer order in the basic settings." The message 52 is an example of a prompt telling the user to change the print settings to content compatible with the print job.

Figure 9:
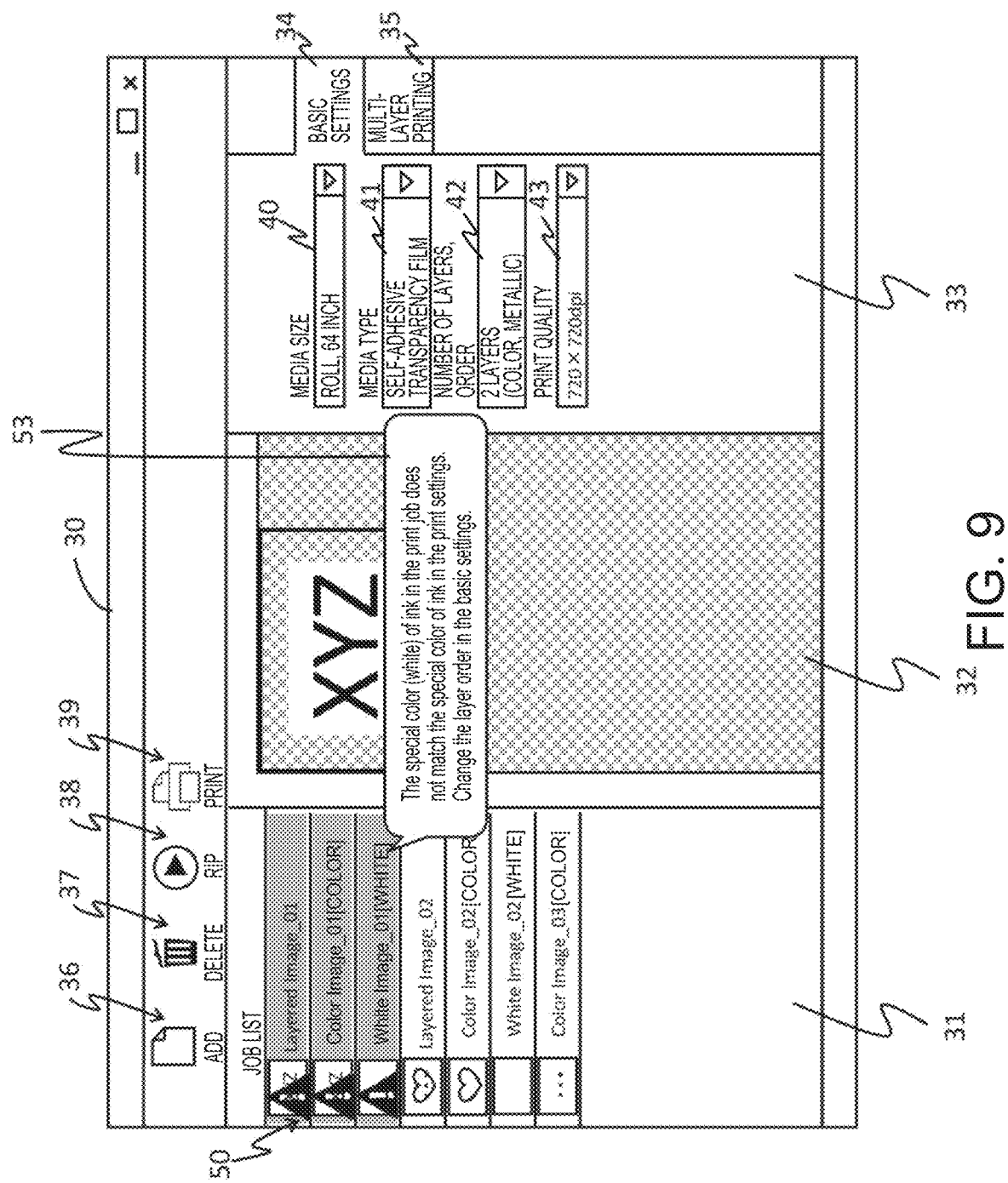
FIG. 9 shows an example of a user interface including displaying an error report in step S140.

FIG. 9 shows another example of a user interface window 30 including an error report displayed in step S140. In the example in FIG. 9, the layer count and layer order are set to two layers (color-metallic) in input field 42 of the print settings pane 33.

The layer order is color-metallic means that a color image is printed on the first layer, and a metallic impression should be printed as a second layer over the first layer. Because this setting is not compatible with printing a white impression included in the first print job selected in the job list pane 31, step S120 returns No, and an error report is displayed as shown in FIG. 9 in step S140.

The first controller 11 may also report an error by superimposing a specific icon 50 indicating an error in the display area of the print job selected in the job list pane 31 as in the examples in FIG. 7 and FIG. 8. The first controller 11 may also display an error report by displaying a popup message 53 describing the content of the error in the user interface window 30. In this example the message 53 contains text such as "The special color (white) of ink in the print job does not match the special color of ink in the print settings. Change the layer order in the basic settings." The message 53 is an example of a prompt telling the user to change the print settings to content compatible with the print job.

The number of layers and the layer order that can be selected in the input field 42 of the print settings pane 33 is not limited to the foregoing. If the print job contains three image layers as shown in the example in FIG. 2A, the first controller 11 may enable the user to select from the input field 42 options such as 3 layers (color→white→color)
3 layers (white→color→color)
3 layers (color→color→white).

If the print job contains three image layers, one layer is color image data, and the other two layers are specific-color image data, the first controller 11 may enable the user to select from the input field 42 options such as 3 layers (white→color→white)
3 layers (white→white→color)
3 layers (color→white→white).

Because a print job may also include a clear impression or metallic impression, in addition to 2 layers (color-metallic) as described above, the first controller 11 may also enable the user to select from the input field 42 options such as 2 layers (metallic→color)
2 layers (color→clear)
2 layers (clear→color).

It will also be obvious that if there are three or more layers, the order of the image layers may also include metallic layer and clear layer options.

The specific condition for starting the process of the flowchart in FIG. 6 is also not limited to a print job being selected in the job list pane 31.

The first controller 11 may also determine the specific condition is met and start the process of the flow chart in FIG. 6 when a print job is selected in the job list pane 31, and a setting in input field 42 of the print settings pane 33 is changed by a user operation. In this event, the current print settings included after the setting is changed are compared with the job-side layer information in the print job.

The first controller 11 may also determine the specific condition is met when a print job is added to the job list pane 31, and start the process of the flow chart in FIG. 6 for the added print job. For example, the first controller 11 may start the process in FIG. 6 when the first print job is added to the job list pane 31, that is, when Layered Image_01, Color Image_01 (color), and White Image_01 (white) are displayed in the job list pane 31, and display Layered Image_01, Color Image_01 (color), and White Image_01 (white) as selection options in the job list pane 31.

The first controller 11 may also apply the process in FIG. 6 to multiple print jobs displayed in the job list pane 31 in parallel. Using the example shown in FIG. 3 and described above, a first print job and a second print job are displayed in the job list pane 31. In this case, prompted by the user changing a setting in input field 42 of the print settings pane 33, for example, the first controller 11 determines if the job-side layer information of the first print job and the second print job is compatible with the current print settings after the setting is changed. If the first print job or the second print job is not compatible with the print settings in the job-side layer information, the first controller 11 may display an error in the user interface window 30 as described above.

The first controller 11 may also determine the specific condition is met and start the process of the flow chart in FIG. 6 when the Print button 39 is operated. In other words, when a print job is selected in the job list pane 31 and operation of the Print button 39 is detected, the first controller 11 starts the process in FIG. 6. In this case, if step S110 returns No, the first controller 11 displays an error report in step S130, and aborts printing based on the selected print job.

Displaying an error report in step S130 and step S140 is not limited to the methods described above.

For example, the first controller 11 may display only one of an specific icon 50 and a message. When an specific icon 50 is displayed, the first controller 11 may superimpose the specific icon 50 over only the area corresponding to the print job in the job list pane 31, such as Layered Image_01 in the examples in FIG. 7 to FIG. 9, instead of superimposing the specific icon 50 in the display areas of the print job and the image layers in the print job to which the error report applies as shown in FIG. 7 to FIG. 9.

Further alternatively, the first controller 11 may also use a specific color indicating an error, such as red, or make the error report flash, in the area of the job list pane 31 corresponding to the print job to which the error report applies.

Further alternatively, the first controller 11 may display an error report in the display 13, and also output an audible warning or warning message from a speaker not shown of the image processing device 10.

Further alternatively, by desirably combining a specific icon 50, color, or flashing display instead of displaying a message as shown in FIG. 7 to FIG. 9, the first controller 11 may differentiate the first error report and second error report for the user by displaying error reports in step S130 and displaying error reports in step S140 in different ways.

The first controller 11 also displays a preview image of the print job in the preview pane 32. For example, when the first print job is selected in the job list pane 31, the first controller 11 generates a preview image using preview image data for the first print job, that is, using the specific-color image data D11$pv$ and color image data D12$pv$ shown in FIG. 4. The first controller 11 generates a preview image by overlaying the specific-color image data D11$pv$ and color image data D12$pv$, and renders and displays the generated preview image in the preview pane 32.

In the examples in FIG. 3 and other figures, the background of the preview pane 32 is a checkered pattern of white and gray. This checkered pattern is an example of a specific pattern used as the background in the preview pane 32. The background of the preview pane 32 is obviously not limited to a checkered pattern, and other patterns or textures, such as dotted patterns and hatching, may be used.

A white impression such as with specific-color image data D11 has the white density of each pixel expressed as a gradation value, and the white gradation value of some pixels is set to no gradation (pixels where W=0). When a preview of the specific-color image data D11 is displayed, that is, when specific-color image data D11$pv$ is displayed in the preview pane 32, if the background of the preview pane 32 is a solid white, areas with a white gradation value in the specific-color image data D11$pv$ (where W≠0), and areas with no white gradation value, cannot be differentiated.

By displaying the background of the preview pane 32 with a specific pattern, the first controller 11 in this embodiment enables differentiating areas having a white gradation value and areas with no white gradation value in the image layer printed with white ink.

The frame indicated by a black line in the top left area of the preview pane 32 is the outside edge of the preview image. A white rectangle is shown in approximately the center of the preview image in the examples in FIG. 3 and other figures, and the area outside the white rectangle and inside the preview image has the same checkered pattern as the background of the preview pane 32. More specifically, the white rectangle in the preview image is the area with a white gradation value. By displaying the preview image in this way, the user can identify, before printing starts, the area where white ink is recorded and the area where white ink is not recorded based on the specific-color image data D11.

Note that when generating and displaying a preview image in the preview pane 32, the first controller 11 applies a transparency process to at least pixels other than objects in each image layer in the preview image, and then displays the preview image. In the specific-color image data D11pv, the objects are in the center of the rectangle with pixels having a white gradation value. In the color image data D12pv, the objects are the letters XYZ. FIG. 3 shows the preview image with the pixels other than for the objects in the specific-color image data D11pv and color image data D12pv transparent.

By applying a transparency process to at least pixels outside the objects in each image layer in the preview image, the first controller 11 can enable the user to see in the preview image the areas that are not covered by objects in any image layer, including the topmost image layer and image layers other than the topmost image layer.

Figure 10:
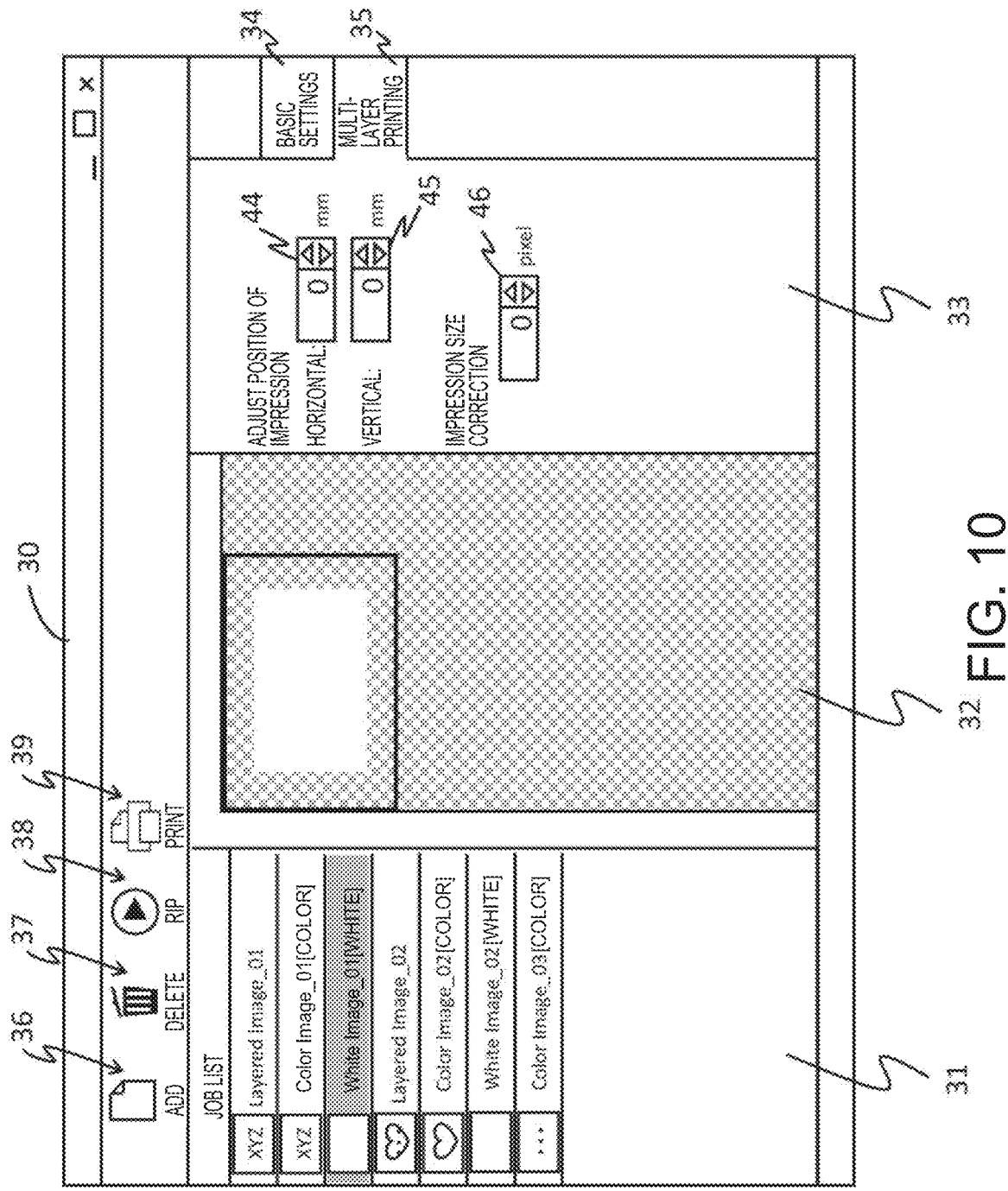
FIG. 10 shows an example of a user interface.

FIG. 10 shows another example of the user interface window 30. Unlike in FIG. 3, and FIG. 7 to FIG. 9, a single image layer is selected in the job list pane 31 in FIG. 10. More specifically, White Image_01 (white) indicating the specific-color image data D11 contained in the first print job is selected. In this case, the first controller 11 displays the specific-color image data D11pv shown in FIG. 4, which is preview image data for the specific-color image data D11, in the preview pane 32. FIG. 10 shows when the specific-color image data D11pv is displayed in the preview pane 32.

Unlike in FIG. 3 and FIG. 7 to FIG. 9, the multi-layer printing tab 35 is selected in the user interface window 30 shown in FIG. 10, and multiple input fields 44, 45, 46 appropriate to the multi-layer printing tab 35 are displayed in the print settings pane 33. The multi-layer printing tab 35 can only be selected in the user interface window 30 when the number of layers in input field 42 of the print settings pane 33 corresponding to the basic settings tab 34 is set to two layers or more.

Input field 44 and input field 45 are input fields for receiving a horizontal position adjustment value and a vertical position adjustment value for the image layer selected in the job list pane 31. The preview image is displayed at the reference position in the preview pane 32 when these adjustment values are 0. The reference position is the position where the top left corner of the preview image matches the top left corner of the preview pane 32.

By inputting an adjustment value to the input field 44 or input field 45, the user can shift the image layer selected in the job list pane 31, that is, the position of the image layer displayed in the preview pane 32, horizontally and vertically relative to the reference position. The display position is adjusted by image layer unit. The position adjustment made through input field 44 and input field 45 is the amount the position of the image layer shifts relative to the other image layers in the print job. In the example in FIG. 10, the user will adjust how much the specific-color image data D11 contained in first print job shifts horizontally and vertically relative to the color image data D12.

Input field 46 is a field for receiving a correction value for the size of the image layer selected in the job list pane 31. By inputting a correction value to the input field 46, the image layer selected in the job list pane 31, or more particularly the horizontal and vertical size of the image layer displayed in the preview pane 32, can be increased or decreased. The size correction is applied by image layer unit. The size correction made through input field 46 is the adjustment in size relative to the other image layers in the print job. In the example in FIG. 10, the user will adjust the horizontal and vertical size of the specific-color image data D11 contained in first print job relative to the color image data D12.

The first controller 11 changes the position and size of the preview image in the preview pane 32, and displays the modified preview image, in conjunction with receiving the adjustment values input through input field 44 and input field 45, and the correction value input through input field 46.

The first controller 11 stores the information received through input fields 40, 41, 42, 43, 44, 45, 46 in the print settings pane 33 as print settings information for the print job as shown in FIG. 4. More specifically, the print settings information in the print job is updated according to user operations in the print settings pane 33. It will also be obvious that print settings other than those shown in the print settings pane 33 in FIG. 3 and in FIG. 7 to FIG. 9 may be selected by the user, including page layout, number of copies, and color correction, for example.

The Delete button 37 included in the user interface window 30 is a button for deleting the print job selected in the job list pane 31 from the job list pane 31.

The RIP button 38 is a button for generating print data based on the print job selected in the job list pane 31. When a print job is selected in the job list pane 31 and operation of the RIP button 38 is then detected, the first controller 11 generates print data for each image layer contained in the selected print job.

The Print button 39 is a button for starting printing based on the print job selected in the job list pane 31. When a print job is selected in the job list pane 31 and operation of the Print button 39 when the Print button 39 is not disabled is then detected, the first controller 11 sends print data generated for each image layer contained in the selected print job through the first communication interface 15 to the printer 20. The first controller 11 also sends the print settings information for the selected print job with the print data to the printer 20.

The second controller 21 of the printer 20 that receives transmission of the print data and printer settings information from the image processing device 10 then controls the printer engine 23 to print multiple layers on the print media according to the print data for each image layer and the print settings information, including the order of the image layers, position adjustment values, size correction values, and other settings.

4. Summary

A image processing device 10 according to this embodiment of the invention that controls displaying by a display has a controller (first controller 11) that determines if a print job having multiple image layers is compatible with the print settings, and displays an error report on the display when determined incompatible.

The image processing device 10 in this configuration determines whether or not the print settings are appropriate based on the relationship to a print job including multiple image layers, and displays an error report on the display if the print settings are incompatible. As a result, a user trying to print a print job including multiple image layers is made aware that the print settings are not appropriate, and producing a wasteful printout can therefore be avoided. A wasteful printout is any printout that is different from the printout expected to result from the print job.

In this embodiment of the invention the controller displays an error report when a first input field for receiving the number of image layers as part of the print settings is displayed on the display, and the number of image layers set by an operation on the input field does not match the number of image layers contained in the print job.

Input field 42 in the print settings pane 33 in the example shown in FIG. 3 is an example of a first input field for receiving the number of image layers as part of the print settings. The image processing device 10 in this configuration can report an error to the user when the number of image layers set according to user operation of the input field does not match the number of image layers contained in the print job.

In this embodiment of the invention the controller displays an error report when a second input field for receiving the color of an image layer to print as part of the print settings is displayed on the display, and the color of the image layer set according to operation of the second input field does not match the color of an image layer contained in the print job.

The first controller 11 receives layer count and layer order settings through input field 42 of the print settings pane 33. The layer order is information specifying the color of the image layer to print and the printing order of the image layers, such as white-color, or color-white. This input field 42 of the print settings pane 33 is therefore an example of a second input field for receiving the color of an image layer to print as part of the print settings. The color of an image layer in the print job is actually indicated by the type of each image layer in the job-side layer information. The image processing device 10 in this configuration can report an error to the user when the color of an image layer set according to user operation of the second input field does not match the print job.

In the design of the user interface window 30 in this embodiment, the input field 42 includes both a first input field and a second input field, but the first input field and second input field may be separated in the user interface window 30. More specifically, an input field for receiving the layer count, and a separate input field for receiving the layer order, may be provided in the print settings pane 33 of the user interface window 30.

The controller in this embodiment of the invention displays a text message, such as messages 52 and 53, as at least part of the error report prompting the user to change the print settings to content compatible with the print job.

By reading the text message, the user in this configuration can easily change the inappropriate print settings to content compatible with the print job.

The controller in this embodiment of the invention also acquires the setting of a specific parameter in the printer selected to print the print job as part of the print settings, and determines if that setting is compatible with the print job.

The image processing device 10 in this configuration determines if a print job containing multiple image layers can actually be printed using the acquired printer settings, and if the print job and printer settings do not match, that is, if the print job cannot be printed using the current printer settings, displays an error report on the display. As a result, producing a wasteful printout can be avoided.

When a job list of one or more print jobs is displayed on the display, and a print job in the job list is determined to be incompatible with the print settings, the controller in this embodiment displays an error report by changing the display state in the job list. Changing the display state in the job list may include displaying a specific icon 50, changing a color, flashing the display, or a combination thereof as described above.

This configuration enables the user to easily recognize a print job in the job list that is incompatible with the print settings.

The controller in this embodiment of the invention also determines whether a print job selected from the print jobs in the job list is compatible with the print settings.

The image processing device 10 in this configuration determines whether a print job selected by the user is compatible with the print settings, and if not compatible, reports an error to the user.

This embodiment of the invention also teaches an image processing program 12 that causes a computer to control displaying content on a display. Step S110 and step S120 in FIG. 6 are equivalent to an evaluation function that is embodied by the image processing program 12 and determines whether or not a print job containing multiple image layers is compatible with print settings.

Step S130 and step S140 are equivalent to a display control function that displays an error report on the display when the print job is not compatible with the print settings.

5. Other Embodiments

Examples of other embodiments of the invention are described below.

Figure 11:
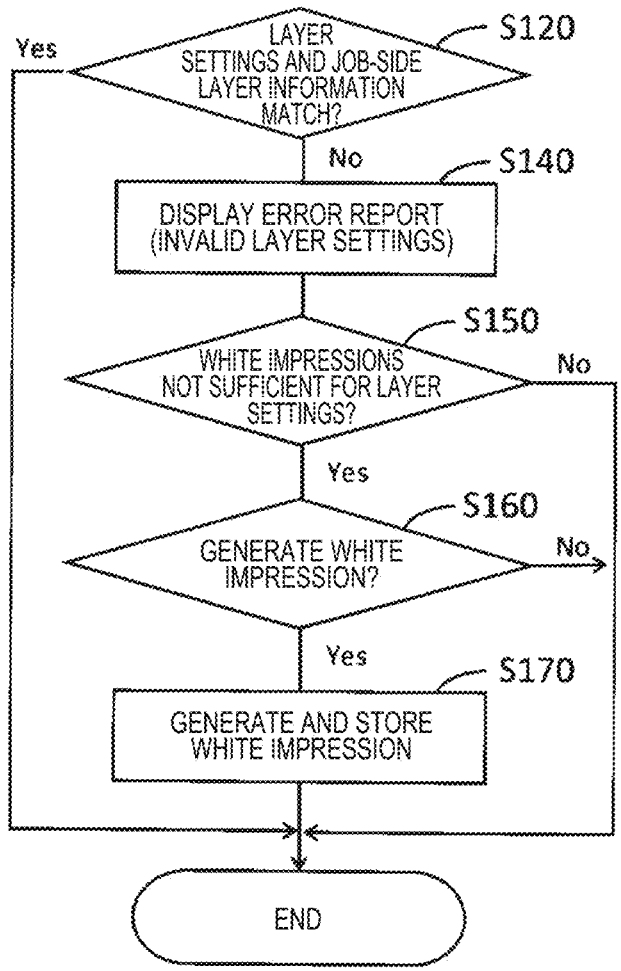
FIG. 11 is a flowchart showing part of the error display control process according to another example.

FIG. 11 is a flow chart of part of an error display control process according to this embodiment. FIG. 11 shows the process following step S120 in FIG. 6. Step S120 and step S140 are as described above.

In step S150 the first controller 11 determines whether or not the white impressions on the print job side are sufficient for the layer settings in the print settings acquired in step S100.

Suppose, for example, that the layer settings require a white impression, such as when the layer setting indicates color-white-color layers. If the job-side layer information of the print job evaluated for compatibility with the print settings indicates the that print job does not include a white impression, the first controller 11 determines there are not enough white impressions for the layer settings, and goes to step S160. More specifically, if the layer settings require a white impression, but a white impression is not included in the print job evaluated for compatibility with the print settings, step S150 returns Yes, and control goes to step S160. However, if the number of white impressions is sufficient for the layer settings, the first controller 11 ends the process without executing step S160 and step S170.

In step 160, the first controller 11 determines whether or not a white impression must be generated, goes to step S170 if generating a white impression is required, and ends the process without executing step S170 if generating a white impression is not required.

For example, if a special mode called an automatic white impression generating mode is previously enabled in the image processing program 12, the first controller 11 determines a white impression should be generated. If the automatic white impression generating mode is not enabled, the first controller 11 determines a white impression should not be generated.

Alternatively, when the first controller 11 determines in step S150 that there are enough white impressions in relation to the layer settings, the first controller 11 queries the user through the user interface window 30 whether or not to generate a white impression. If the user responds to the query that a white impression should be generated, the first controller 11 determines to generate a white impression.

If the user respond to the query is that a white impression should not be generated, the first controller 11 determines to not generate a white impression.

However, the evaluation of step S160 may be omitted. That is, if the first controller 11 determines in step S150 that a white impression is missing relative to the layer settings, the first controller 11 may be configured to go directly to step S170.

In step 170, the first controller 11 generates specific-color image data of a specific size including specific gradation values for each pixel, that is, generates a white impression, and stores the print job with the generated white impression as an image layer of the print job evaluated for compatibility with the print settings.

When generating a white impression in step S170, the first controller 11 may receive through the user interface window 30 user settings for the image size of the white impression, the area in the image where white gradation values should be applied, and the white gradation values, and generate the white impression according to the received settings.

When it is determined in step S150 that white impressions are not sufficient for the layer settings, the error report displayed on the display 13 in step S140 may be a text message such as "The print job does not include a white impression. Change the job, or change the basic settings."

When the print job and the print settings do not match, the first controller 11 in this embodiment generates the missing white impressions in the print job according to the print settings, and includes the generated image layer in the print job.

In other words, by augmenting the configuration of the print job according to the print settings when there is a mismatch between the print job and print settings, a printout corresponding to the print settings specified by the user can be produced. Note that image layers generated and inserted to the print job because of a deficiency in the print job are not limited to white impressions, and may be a metallic impression or clear impression.

A number of steps in the flow chart in FIG. 6 may also be omitted. For example, the sequence of steps S100, S110, and S130 may be embodied as a single step in another embodiment of the invention. In addition, the sequence of steps S100, S120, and S140 may be embodied as a single step in another embodiment of the invention.

The configuration and design of the user interface window 30 is obviously not limited to the examples shown in FIG. 3 and FIG. 7 to FIG. 10. For example, the elements described as being in the user interface window 30 are not limited to all being in a single user interface window, and may be divided between multiple windows and displayed by changing the windows shown on the display 13.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device that controls displaying content by a display, comprising:
    a controller configured to evaluate whether or not at least one of a number of image layers or a type of each image layer contained in a print job is compatible with a print setting, and
    when the print job and print setting are not compatible, display an error report on the display and refrain from starting printing the print job, wherein:
    each of the number of image layers belongs to one of a plurality of types,
    the plurality of types includes at least (1) a color image layer, and (2) a specific-color image layer,
    each color image layer contains red, green, and blue gradation values for each pixel, and
    each specific-color image layer contains gradation values of a corresponding specific-color for each pixel.

2. The image processing device described in claim 1, wherein:
    the controller displays a first input field to receive a number of image layers as part of the print setting, and displays the error report when a number of image layers set according to an operation on the first input field is not compatible with a number of image layers contained in the print job.

3. The image processing device described in claim 1, wherein:
    the controller displays a second input field to receive a color of an image layer as part of the print setting, and displays the error report when the color of an image layer set according to an operation on the second input field is not compatible with a color of an image layer contained in the print job.

4. The image processing device described in claim 1, wherein:
    the controller displays, as part of the error report, a text message prompting changing the print setting to content compatible with the print job.

5. The image processing device described in claim 1, wherein:
    when the print job and the print setting are not compatible, the controller generates an image layer missing in the print job according to the print setting, and includes the generated image layer in the print job.

6. The image processing device described in claim 1, wherein:
    the controller acquires, as part of the print setting, a setting of a specific item in a printer selected to print based on the print job, and determines if the setting of the specific item is compatible with the print job.

7. The image processing device described in claim 1, wherein:
    the controller displays a job list of one or more print jobs on the display, and for a print job that is in the job list and is determined to be not compatible with the print setting, displays an error report by changing the appearance of the print job in the job list.

8. The image processing device described in claim 7, wherein:
    the controller evaluates a print job selected from among print jobs displayed in the job list for compatibility with the print settings.

9. A non-transitory computer-readable computer medium storing an image processing program that causes a computer to control displaying by a display, comprising:
    an evaluation function of determining whether or not at least one of a number of image layers or a type of each image layer contained in a print job is compatible with a print setting; and
    when the print job and the print setting are not compatible, display an error report on the display and refrain from starting printing the print job,
    wherein:
    each of the number of image layers belongs to one of a plurality of types, the plurality of types includes at least (1) a color image layer, and (2) a specific-color image layer, each color image layer contains red, green, and blue gradation values for each pixel, and each specific-color image layer contains gradation values of a corresponding specific-color for each pixel.

* * * * *